United States Patent
Omata

(10) Patent No.: US 11,549,010 B2
(45) Date of Patent: Jan. 10, 2023

(54) THERMOPLASTIC RESIN COMPOSITION HAVING IMPROVED BEND/WRINKLE RESISTANT PROPERTIES AND FORMED ARTICLE THEREOF

(71) Applicant: TECHNO-UMG CO., LTD., Tokyo (JP)

(72) Inventor: Yuuki Omata, Tokyo (JP)

(73) Assignee: TECHNO-UMG CO., LTD., Tokyo (JP)

( * ) Notice: Subject to any disclaimer, the term of this patent is extended or adjusted under 35 U.S.C. 154(b) by 0 days.

(21) Appl. No.: 17/616,910

(22) PCT Filed: Apr. 1, 2021

(86) PCT No.: PCT/JP2021/014187
§ 371 (c)(1),
(2) Date: Dec. 6, 2021

(87) PCT Pub. No.: WO2021/206985
PCT Pub. Date: Oct. 14, 2021

(65) Prior Publication Data
US 2022/0204749 A1 Jun. 30, 2022

(30) Foreign Application Priority Data

Apr. 8, 2020 (JP) .............................. JP2020-069838
Aug. 21, 2020 (JP) .............................. JP2020-140258

(51) Int. Cl.
| | | |
|---|---|---|
| *C08L 55/02* | (2006.01) | |
| *C08L 53/02* | (2006.01) | |
| *C08K 3/34* | (2006.01) | |
| *C08L 51/04* | (2006.01) | |
| *C08L 69/00* | (2006.01) | |

(52) U.S. Cl.
CPC ............... *C08L 55/02* (2013.01); *C08K 3/34* (2013.01); *C08L 51/04* (2013.01); *C08L 69/00* (2013.01)

(58) Field of Classification Search
None
See application file for complete search history.

(56) References Cited

U.S. PATENT DOCUMENTS

2012/0252945 A1 * 10/2012 Yamaguchi ............ C08K 5/523
524/141
2018/0223098 A1    8/2018 Inazawa
2019/0119481 A1 *  4/2019 Michaelis De Vasconcellos et al. ........................ C08L 25/12

FOREIGN PATENT DOCUMENTS

| EP | 3392306 | * 10/2018 |
| JP | H10-298419 A | 11/1998 |
| JP | 2004-123823 A | 4/2004 |
| JP | 2013-159122 A | 8/2013 |
| JP | 2016-199729 A | 12/2016 |
| JP | 2017-008227 A | 1/2017 |
| JP | 2017-109312 A | 6/2017 |
| JP | 2019-073645 A | 5/2019 |
| WO | 2017/033783 A1 | 3/2017 |

OTHER PUBLICATIONS

CAMEO entry for Muscovite (2019) pp. 1-3. (Year: 2019).*
JSR Dyanron (2017) cover pp. 1-2 and pp. 1-8. (Year: 2017).*
Asahi Kasei Tuftec (2015) pp. 1-19. (Year: 2015).*
PCT/ISA/210, "International Search Report for International Application No. PCT/JP2021/014187," dated Jun. 1, 2021.
Notice of Reasons for Refusal; Japanese Patent Application No. 2020-140258; dated Jun. 28, 2021.

* cited by examiner

*Primary Examiner* — David J Buttner
(74) *Attorney, Agent, or Firm* — Manabu Kanesaka

(57) ABSTRACT

A thermoplastic resin composition including 7% to 64% by mass of rubber-containing graft copolymer (A), 2% to 35% by mass of thermoplastic elastomer (B), 0.5% to 90% by mass of another thermoplastic resin (C), and 0.5% to 20% by mass of inorganic compound (D) (total (A)-(D) is 100% by mass). The copolymer (A) is a graft copolymer in which 35 to 80 parts by mass of rubber-like polymer (a1) is graft-polymerized with 20 to 65 parts by mass of vinyl-based monomer mixture (a2) containing an aromatic-vinyl-based monomer and a vinyl-cyanide-based monomer. The content of polymer (a1) in the total 100% by mass of the components (A)-(D) is 2% to 35% by mass, and a difference between the content of the polymer (a1) in the total 100% by mass of the component (A) to the component (D) and the content of the elastomer (B) is within 15% by mass.

16 Claims, No Drawings

THERMOPLASTIC RESIN COMPOSITION HAVING IMPROVED BEND/WRINKLE RESISTANT PROPERTIES AND FORMED ARTICLE THEREOF

TECHNICAL FIELD

The present invention relates to a thermoplastic resin composition capable of realizing a formed article having excellent formability, undergoing no peeling nor whitening, acquiring excellent formed-article appearance, mechanical properties, and weld strength, having bending performance so that no wrinkles occur due to bending and that the bending property is maintained against repetitions, and having slip resistance and high grip performance. The present invention also relates to a formed article produced by forming the thermoplastic resin composition.

BACKGROUND ART

Rubber-reinforced aromatic-vinyl-based resins typified by ABS resins have an excellent physical-property balance between impact resistance and formability and excellent formed article appearance and, therefore, are widely used for OA equipment, home appliances, sundry goods, construction materials, and the like.

Of these, OA equipment such as personal computers and printers and home appliances such as cameras, videos, vacuum cleaners, and washing machines, which are frequently used or operated with hand, and car interior parts such as door trims and glove boxes, which are frequently touched with passenger bodies, are required to have favorable feelings such as cushioning properties and hand feeling while stiffness of the part is maintained.

To satisfy such requirements, some products are produced by bonding a facing material having flexibility to a core member having stiffness and performing slush molding or the like. However, since the slush molding includes a large number of steps and raw materials are expensive, the slush molding is used for producing just some products (refer to PTL 1).

It is known that a formed article having an excellent surface touch feeling due to not only having excellent mechanical strength and formed article appearance, but also having high cushioning properties, highly soft touch feeling, and reduced feeling of stickiness is obtained by mixing a thermoplastic elastomer to a rubber-reinforced aromatic-vinyl-base resin having a rubber portion composed of a diene-based resin and silicone rubber or ethylene•α-olefin-based rubber (refer to PTL 2 and PTL 3). However, a formed article having excellent surface glossiness and having slip resistance and touch feeling excellent in grip feeling has not been obtained.

PTL 4 proposes a formed article that is composed of a thermoplastic resin composition containing a specific rubber-reinforced vinyl-base resin and a thermoplastic elastomer and that has an MIU value of 0.4 or more as a thermoplastic resin formed article having excellent mechanical strength and formed article appearance such as surface glossiness and having slip resistance and touch feeling excellent in grip feeling. However, this thermoplastic resin formed article is not sufficient in the performance, such as repetitive bending property, and a further improvement in the strength of a formed article for a casing is desired.

PTL 1: Jp 2013-159122 A
PTL 2: Jp 2016-199729 A
PTL 3: Jp 2017-8227 A
PTL 4: Jp 2019-73645 A

SUMMARY OF INVENTION

It is an object of the present invention to provide a thermoplastic resin composition capable of realizing a formed article having excellent formability, undergoing no peeling nor whitening, acquiring excellent formed-article appearance, mechanical properties, and weld strength, having bending performance so that no wrinkles occur due to bending and so that the bending property is maintained against repetitions, and having slip resistance and high grip performance and to provide a formed article thereof.

The present inventor found that the above-described object can be achieved by a thermoplastic resin composition containing a rubber-containing graft copolymer (A), a thermoplastic elastomer (B), another thermoplastic resin (C), and an inorganic compound (D) at a specific ratio.

The scope of the present invention is as described below.

[1] A thermoplastic resin composition comprising 7% to 64% by mass of rubber-containing graft copolymer (A), 2% to 35% by mass of thermoplastic elastomer (B), 0.5% to 90% by mass of another thermoplastic resin (C), and 0.5% to 20% by mass of inorganic compound (D) (where a total of (A), (B), (C), and (D) (hereafter referred to as "total of a component (A) to a component (D)") is 100% by mass), wherein the rubber-containing graft copolymer (A) is a graft copolymer in which 35 to 80 parts by mass of rubber-like polymer (a1) is graft-polymerized with 20 to 65 parts by mass of vinyl-based monomer mixture (a2) containing an aromatic-vinyl-based monomer and a vinyl-cyanide-based monomer (where a total of the rubber-like polymer (a1) and the vinyl-based monomer mixture (a2) is 100% by mass), the content of the rubber-like polymer (a1) in the total 100% by mass of the component (A) to the component (D) is 2% to 35% by mass, and a difference between the content (% by mass) of the rubber-like polymer (a1) in the total 100% by mass of the component (A) to the component (D) and the content (% by mass) of the thermoplastic elastomer (B) is within 15% by mass.

[2] The thermoplastic resin composition according to [1], wherein the another thermoplastic resin (C) is at least one selected from a group consisting of acrylonitrile-styrene-based resins, polycarbonate-based resins, polyacrylic resins, and polybutylene-terephthalate-based resins.

[3] The thermoplastic resin composition according to [1] or [2], wherein the volume average particle diameter of the rubber-like polymer (a1) is 100 to 1,500 nm, the ratio of the aromatic-vinyl-based monomer to the vinyl-cyanide-based monomer in 100% by mass of the vinyl-based monomer mixture (a2) is aromatic-vinyl-based monomer/vinyl-cyanide-based monomer=50% to 95% by mass/50% to 5% by mass, and the graft rate of the rubber-containing graft copolymer (A) is 20% to 100% by mass.

[4] The thermoplastic resin composition according to any one of [1] to [3], wherein the MFR (200° C., 49.0 N) of the thermoplastic elastomer (B) is 1 to 25 g/10 min, and the MFR (230° C., 21.2 N) is 3 to 30 g/10 min.

[5] The thermoplastic resin composition according to any one of [1] to [4], wherein the thermoplastic elastomer (B) is a block copolymer containing at least one polymer block P of an aromatic vinyl compound and at least one polymer block Q of a conjugated diene compound and/or a hydrogenation product thereof and is a styrene-based elastomer having a mass average particle diameter of 10,000 to 800, 000, a content of the polymer block P of 5% to 60% by mass, and a content of the polymer block Q of 95% to 40% by mass.

[6] The thermoplastic resin composition according to any one of [1] to [5], wherein the inorganic compound (D) is muscovite.

[7] A thermoplastic resin formed article produced by forming the thermoplastic resin composition according to any one of [1] to [6].

Advantageous Effects of Invention

According to the thermoplastic resin composition of the present invention, a thermoplastic resin composition capable of realizing a formed article having excellent formability, undergoing no peeling nor whitening, acquiring excellent formed-article appearance, mechanical properties, and weld strength, having bending performance so that no wrinkles occur due to bending and so that the bending property is maintained against repetitions, and having slip resistance and high grip performance and a formed article thereof can be provided.

DESCRIPTION OF EMBODIMENTS

The embodiment according to the present invention will be described below in detail.

In the present specification, "formed article" denotes a product obtained by forming a thermoplastic resin composition.

"Unit" denotes a structural portion derived from a monomer compound before polymerization and introduced into a polymer or a copolymer. For example, "aromatic-vinyl-based monomer unit" denotes "structural portion derived from an aromatic-vinyl-based monomer and introduced into a polymer or a copolymer".

"(Meth)acrylic acid" denotes one of or both "acrylic acid" and "methacrylic acid".

[Thermoplastic Resin Composition]

The thermoplastic resin composition according to the present invention is a thermoplastic resin composition containing a rubber-containing graft copolymer (A) (hereafter also referred to as "component (A)"), a thermoplastic elastomer (B) (hereafter also referred to as "component (B)"), another thermoplastic resin (C) other than the rubber-containing graft copolymer (A) and the thermoplastic elastomer (B) (hereafter also referred to as "component (C)"), and an inorganic compound (D) (hereafter also referred to as "component (D)") at a specific ratio.

[Rubber-Containing Graft Copolymer (A)]

The rubber-containing graft copolymer (A) is produced by graft-polymerizing a vinyl-based monomer mixture (a2) in the presence of a rubber-like polymer (a1).

<Rubber-Like Polymer (a1)>

There is no particular limitation regarding the rubber-like polymer (a1) (hereafter also referred to as "component (a1)") constituting the rubber-containing graft copolymer (A), and examples include diene-based rubber, acrylic rubber, and ethylene-based rubber.

Specific examples include polybutadienes, poly(butadiene-styrene)s, poly(butadiene-acrylonitrile)s, polyisoprenes, poly(butadiene-butyl acrylate)s, poly(butadiene-methyl acrylate)s, poly(butadiene-methacrylate)s, poly(butadiene-ethyl acrylate)s, ethylene-propylene rubber, ethylene-propylene-diene rubber, poly(ethylene-isobutylene)s, polyethylene-methyl acrylate)s, and poly(ethylene-ethyl acrylate)s.

These rubber-like polymers are used alone, or at least two types are used in combination.

Of these, polybutadienes and styrene-butadiene copolymer rubber are particularly preferably used from the viewpoint of improving the impact resistance.

The volume average particle diameter of the rubber-like polymer (a1) is preferably 100 to 1,500 nm, further preferably 150 to 1,000 nm, and more preferably 200 to 500 nm from the viewpoint of impact resistance, formability, fluidity, and appearance of the resulting thermoplastic resin composition.

The volume average particle diameter of the rubber-like polymer (a1) is a value measured by a method described in the example later.

<Vinyl-Based Monomer Mixture (a2)>

A vinyl-based monomer mixture (a2) (hereafter also referred to as "component (a2)") is a vinyl-based monomer mixture containing at least an aromatic-vinyl-based monomer and a vinyl-cyanide-based monomer.

Examples of the aromatic-vinyl-based monomer include styrene, α-methylstyrene, p-methylstyrene, vinyltoluene, t-butylstyrene, o-ethylstyrene, o-chlorostyrene, and o,p-dichlorostyrene.

These may be used alone, or at least two types may be used in combination.

Examples of the vinyl-cyanide-based monomer include acrylonitrile, methacrylonitrile, and ethacrylonitrile. In particular, acrylonitrile is preferable.

The vinyl-cyanide-based monomers may be used alone, or at least two types may be used in combination.

The ratio of the aromatic-vinyl-based monomer to the vinyl-cyanide-based monomer in 100% by mass of the vinyl-based monomer mixture (a2) is preferably aromatic-vinyl-based monomer/vinyl-cyanide-based monomer=50% to 95% by mass/50% to 5% by mass, more preferably 60% to 85% by mass/40% to 15% by mass, and further preferably 65% to 80% by mass/35% to 20% by mass from the viewpoint of the formability and the formed article appearance.

The vinyl-based monomer mixture (a2) may include, in addition to the aromatic-vinyl-based monomer and the vinyl-cyanide-based monomer, another vinyl-based monomer copolymerizable with these in the range of 0% to 30% by mass. Examples of the another vinyl-based monomer copolymerizable with these include at least one of unsaturated carboxylic acid ester-based monomers, such as methyl (meth)acrylate, maleimide compounds, such as N-methylmaleimide, N-cyclohexylmaleimide, and N-phenylmaleimide, unsaturated dicarboxylic acids, such as maleic acid, unsaturated dicarboxylic acid anhydrides, such as maleic anhydride, and unsaturated amides, such as acrylamide, but the vinyl-based monomer is not limited to these. Of these, methyl (meth)acrylate, N-phenylmaleimide, and maleic anhydride are preferable.

<Proportion of Rubber-Like Polymer (a1) and Vinyl-Based Monomer Mixture (a2)>

The rubber-containing graft copolymer (A) is produced by graft-polymerizing 20% to 65% by mass of vinyl-based monomer mixture (a2) in the presence of 35% to 80% by mass of rubber-like polymer (a1). In this regard, the total of the rubber-like polymer (a1) and the vinyl-based monomer mixture (a2) is 100% by mass.

When the rubber-like polymer (a1) is less than 35% by mass, and the vinyl-based monomer mixture (a2) is more than 65% by mass, the weld strength and the wrinkling resistance are poor. When the rubber-like polymer (a1) is more than 80% by mass, and the vinyl-based monomer mixture (a2) is less than 20% by mass, the formability and the thermal stability during forming deteriorate. The proportion of the rubber-like polymer (a1) is preferably 45% to 78% by mass and more preferably 53% to 73% by mass. The proportion of the vinyl-based monomer mixture (a2) is preferably 22% to 55% by mass and more preferably 27% to 47% by mass.

The entire amount of the vinyl-based monomer mixture (a2) is not necessarily grafted, and the rubber-containing graft copolymer (A) obtained as a mixture with a copolymer that is not grafted is used usually. This mixture is essentially a composition but is included in the rubber-containing graft copolymer (A) in the present invention.

There is no particular limitation regarding the graft rate of the rubber-containing graft copolymer (A), but, from the viewpoint of the impact resistance, the graft rate is preferably 20% to 100% by mass, more preferably 30% to 80% by mass, and further preferably 40% to 70% by mass.

The graft rate of the rubber-containing graft copolymer (A) is measured by a method described in the example later.

There is no particular limitation regarding the method for graft-polymerizing the rubber-containing graft copolymer (A), and production can be performed by using any known method, such as an emulsion polymerization method, a suspension polymerization method, a continuous bulk polymerization method, and a continuous solution polymerization method. Preferably, the rubber-containing graft copolymer (A) is produced by using an emulsion polymerization method or a bulk polymerization method. Since the emulsifier content and the amount of water in the rubber-containing graft copolymer (A) are readily adjusted, it is most preferable that the rubber-containing graft copolymer (A) be produced by using the emulsion polymerization method.

Regarding the thermoplastic resin composition according to the present invention, the content of the component (A) in the total 100% by mass of the component (A) to the component (D) is 7% to 64% by mass, preferably 10% to 55% by mass, and more preferably 15% to 52% by mass. When the content of the component (A) is more than or equal to the above-described lower limit, the weld strength and the weld retention rate are favorable. When the content of the component (A) is less than or equal to the above-described upper limit, the formability is favorable.

The content of the rubber-like polymer (a1) in 100% by mass of the thermoplastic resin composition is 2% to 35% by mass, preferably 5% to 35% by mass, and more preferably 8% to 33% by mass. When the content of the rubber-like polymer (a1) is more than or equal to the above-described lower limit, the touch feeling (grip performance), the slip resistance, and the weld strength are favorable. When the content of the rubber-like polymer (a1) is less than or equal to the above-described upper limit, the formability is favorable.

[Thermoplastic Elastomer (B)]

There is no particular limitation regarding the thermoplastic elastomer (B) used in the present invention provided that the polymer can produce a formed article having rubber elasticity by forming through heat-melting. The thermoplastic elastomer (B) can be formed through heat-melting, but the diene-based rubber and the non-diene-based rubber used in the component (a1) cannot be formed through heat-melting. Therefore, the two differ from each other.

The MFR (200° C., 49.0 N) of the thermoplastic elastomer (B) is preferably 1 to 25 g/10 min and more preferably 2 to 15 g/10 min.

The MFR (230° C., 21.2 N) of the thermoplastic elastomer (B) is preferably 3 to 30 g/10 min and more preferably 5 to 20 g/10 min.

Specific examples of the thermoplastic elastomer (B) include styrene-based elastomers, diene-based elastomers, such as polybutadiene-based elastomers, olefin-based elastomers, urethane-based elastomers, polyvinylchloride-based elastomers, ester-based elastomers, fluororesin-based elastomers, and ion-crosslinked elastomers (ionomers). These thermoplastic elastomers may be used alone, or at least two types may be used in combination.

Of these, styrene-based elastomers and diene-based elastomers, such as polybutadiene-based elastomers, are favorable from the viewpoint of the touch feeling (grip feeling) and the slip resistance.

Specific examples of the styrene-based elastomer include block copolymers containing at least one polymer block P of an aromatic vinyl compound and at least one polymer block Q of a conjugated diene compound and hydrogenation products thereof. The polymer block P and the polymer block Q may be bonded in a straight chain type or may be bonded in a radial type.

The polymer block Q may be a random copolymer containing a small amount of aromatic vinyl compound as a constituent unit or may be a so-called taper-type block in which the content of the constituent unit derived from an organic vinyl compound gradually increases.

There is no particular limitation regarding the structure of the block copolymer, and any one of (P-Q)n type, (P-Q)n-A type, and (P-Q)n-C type can be adopted.

In the formulae, P represents a polymer block of an aromatic vinyl compound, Q represents a polymer block of a conjugated diene compound, C represents a coupling agent residue, and n represents an integer of 1 or more.

Regarding the aromatic vinyl compound serving as the constituent unit of the polymer block P of the styrene-based elastomer, all aromatic vinyl compounds listed as the vinyl-based monomer of the above-described component (a2) may be used, and styrene is preferably used.

These aromatic vinyl compounds may be used alone, or at least two types may be used in combination.

Examples of the conjugated diene compound serving as the constituent unit of the polymer block Q of the styrene-based elastomer include 1,3-butadiene, isoprene, 2-methyl-1,3-butadiene, 2,3-diethyl-butadiene, 2-neopentyl-1,3-butadiene, 2-chloro-1,3-butadiene, 2-cyano-1,3-butadiene, substituted straight-chain conjugated pentadienes, and straight-chain or side-chain conjugated hexadienes. Of these, 1,3-butadiene, isoprene, and 2-methyl-1,3-butadiene are preferable.

These conjugated diene compounds may be used alone, or at least two types may be used in combination.

The content of the polymer block P of the styrene-based elastomer is preferably 5% to 60% by mass and more preferably 15% to 50% by mass. The content of the polymer block Q of the styrene-based elastomer is preferably 95% to 40% by mass and more preferably 85% to 50% by mass. When the contents of the polymer blocks P and Q are within the above-described ranges, the touch feeling (grip feeling) and the slip resistance are favorable.

The styrene-based elastomer that is not hydrogenated and that is composed of the above-described block copolymer can be produced through block copolymerization by using a common method. The hydrogenated product of the block copolymer can be obtained by subjecting the polymer block Q of the conjugated diene compound obtained as described above to a hydrogenation reaction by using a known method.

Specific methods include methods described in JP 42-8704 B, JP 43-6636 B, JP 63-4841 B, JP 63-5401 B, JP 2-133406 A, and JP 1-297413 A.

Regarding the hydrogenation reaction, when a conjugated-diene-based polymer in which the polymer block Q is a polymer block of 1,3-butadiene is nonselectively hydrogenated, ethylene is generated from a portion polymerized through 1,4-vinyl bonding, and butylene is generated from a portion polymerized through 1,2-vinyl bonding, so that a styrene-ethylene-butylene-styrene copolymer (SEBS) and the like are generated as hydrogenation products. When a 1,2-vinyl bond is selectively hydrogenated, a styrene-butadiene-butylene-styrene copolymer (SBBS) and the like are generated as hydrogenation products.

Preferable examples of the styrene-based elastomer include a styrene-butadiene-styrene block copolymer (SBS), a styrene-ethylene-butylene-styrene copolymer (SEBS), a styrene-butadiene-butylene-styrene copolymer (SBBS), and a styrene-isoprene-styrene copolymer (SIS). Of these, in particular, a styrene-ethylene-butylene-styrene copolymer (SEBS) is favorable from the viewpoint of the touch feeling (grip feeling) and the slip resistance.

Commercially available products may be used as SEBS. Examples of the commercially available product serving as SEBS include DYNARON Series (trade name, produced by JSR Corporation), RABALON Series (trade name, produced by MITSUBISHI CHEMICAL CORPORATION), Tuftec Series (trade name, produced by Asahi Kasei Corporation), and TPE-SB Series (trade name, produced by Sumitomo Chemical Co., Ltd.).

Examples of the thermoplastic elastomer (B) other than the styrene-based elastomer include high cis- and low cis-butadiene rubber (BR), high cis-isoprene rubber (IR), emulsification polymerization and solution polymerization styrene-butadiene rubber (SBR), acrylonitrile-butadiene rubber (NBR), ethylene-propylene rubber (EPM, EPDM), chloroprene rubber, butyl rubber, and natural rubber (NR).

The thermoplastic elastomers (B) such as styrene-based elastomers may be used alone, or at least two types that differ from each other in elastomer species, structure, constituent unit, physical properties, or the like may be used in combination.

Regarding the thermoplastic resin composition according to the present invention, the content of the component (B) in the total 100% by mass of the component (A) to the component (D) is 2% to 35% by mass, preferably 5% to 34% by mass, and more preferably 8% to 33% by mass. When the content of the component (B) is more than or equal to the above-described lower limit, the weld strength, the weld retention rate, the touch feeling (grip performance), and the slip resistance are favorable. When the content of the component (B) is less than or equal to the above-described upper limit, the formability and the formed article appearance are favorable.

Regarding the thermoplastic resin composition according to the present invention, an absolute value of the difference between the content (% by mass) of the component (a1) in the total 100% by mass of the component (A) to the component (D) and the content (% by mass) of the component (B) (hereafter also referred to as "(a1)-(B)") is within 15% by mass. When the (a1)-(B) is within 15% by mass, the formed article appearance, the wrinkling resistance, the wrinkling resistance against repetitions, and the weld strength are favorable. The (a1)-(B) is preferably within 10% by mass, more preferably within 8.0% by mass, and further preferably within 6.0% by mass, particularly preferably within 5% by mass, especially preferably within 3.5% by mass, and most preferably 0% to 2.0% by mass.

When the (a1)-(B) is within 15% by mass, either the component (a1) or the component (B) may be larger in amount.

[Another Thermoplastic Resin (C)]

Another thermoplastic resin (C) contained in the thermoplastic resin composition according to the present invention is a thermoplastic resin other than the component (A) and the component (B), and examples include acrylonitrile-styrene-based resins, polycarbonate-based resins, polyacrylic resins, polybutylene-terephthalate-based resins, vinyl-chloride-based resins, polyamide-based resins, polyethylene-based resins, polybutylene-based resins, and polyoxymethylene-based resins.

In particular, since the thermoplastic resin composition according to the present invention is a resin expected to have adhesion to a casing resin of OA equipment and the like or to be used as just the casing and since a balance between physical properties is readily achieved, acrylonitrile-styrene-based resins, polycarbonate-based resins, polyacrylic resins, and polybutylene-terephthalate-based resins are particularly suitable for the another thermoplastic resin (C).

The thermoplastic resins (C) may be used alone, or at least two types may be used in combination.

Regarding the thermoplastic resin composition according to the present invention, the content of the component (C) in the total 100% by mass of the component (A) to the component (D) is 0.5% to 90% by mass, preferably 2% to 83% by mass, and more preferably 4% to 74% by mass. When the content of the component (C) is more than or equal to the above-described lower limit, the formability is excellent. When the content of the component (C) is less than or equal to the above-described upper limit, the weld strength and the weld retention rate are excellent.

<Acrylonitrile-Styrene-Based Resin>

The acrylonitrile-styrene-based resin is a copolymer having structural portions derived from an aromatic-vinyl-based monomer and a vinyl-cyanide-based monomer.

Examples of the aromatic-vinyl-based monomer include styrene, α-methylstyrene, p-methylstyrene, vinyltoluene, t-butylstyrene, o-ethylstyrene, o-chlorostyrene, and o,p-dichlorostyrene. These may be used alone, or at least two types may be used in combination.

Examples of the vinyl-cyanide-based monomer include acrylonitrile, methacrylonitrile, and ethacrylonitrile. In particular, acrylonitrile is preferable. The vinyl-cyanide-based monomer may also be used alone, or at least two types may also be used in combination.

The ratio of the aromatic-vinyl-based monomer unit to the vinyl-cyanide-based monomer unit in 100% by mass of the acrylonitrile-styrene-based resin is aromatic-vinyl-based monomer unit/vinyl-cyanide-based monomer unit=preferably 50% to 95% by mass/50% to 5% by mass, more preferably 60% to 85% by mass/40% to 15% by mass, and further preferably 65% to 80% by mass/35% to 20% by mass from the viewpoint of the formability and the formed article appearance.

The acrylonitrile-styrene-based resin may contain, in addition to the aromatic-vinyl-based monomer and the vinyl-cyanide-based monomer, other vinyl-cyanide-based monomer units copolymerizable with these in a range of 0% to 30% by mass. Examples of the other vinyl-based monomer copolymerizable with these include at least one of unsaturated carboxylic acid ester-based monomers, such as methyl (meth)acrylate, maleimide compounds, such as N-methylmaleimide, N-cyclohexylmaleimide, and N-phenylmaleimide, unsaturated dicarboxylic acids, such as maleic acid, unsaturated dicarboxylic acid anhydrides, such as maleic anhydride, and unsaturated amides, such as acrylamide, but the vinyl-based monomer is not limited to these. Of these, methyl (meth)acrylate, N-phenylmaleimide, and maleic anhydride are preferable.

The mass average molecular weight (Mw) of the acrylonitrile-styrene-based resin is preferably 50,000 to 400,000, more preferably 70,000 to 350,000, and further preferably 90,000 to 300,000.

The molecular weight distribution (Mw/Mn) of the acrylonitrile-styrene-based resin is preferably 1.3 to 2.8, more preferably 1.8 to 2.6, and further preferably 1.9 to 2.4.

The mass average molecular weight and the molecular weight distribution of the acrylonitrile-styrene-based resin can be measured as values in terms of polystyrene on the basis of GPC.

The acrylonitrile-styrene-based resins may be used alone, or at least two types of acrylonitrile-styrene-based resins that differ from each other in monomer composition, molecular weight, or the like may be used in combination.

<Polycarbonate Resin>

The polycarbonate resin is a polymer of a basic structure having a carbonate bond denoted by a general formula —(—O—R—O—C(=O)—)—.

Regarding the polycarbonate resin, aromatic polycarbonate resins having a basic structure in which a carbon atom directly bonding to a carbonate bond is an aromatic carbon atom are preferable. In such an instance, in the formula, R is generally an aromatic hydrocarbon group but may be an aromatic hydrocarbon group in which a hetero atom or a hetero bond is introduced to provide various characteristics.

Typical examples of the aromatic polycarbonate resin include aromatic polycarbonate resins produced from dihydroxyaryl compounds, such as 2,2-bis(4-hydroxyphenyl) propane (bisphenol A).

Examples of the dihydroxyaryl compound include, in addition to bisphenol A, bis(hydroxyaryl)alkanes, such as bis(4-hydroxyphenyl)methane, 1,1-bis(4-hydroxyphenyl) ethane, 2,2-bis(4-hydroxyphenyl)butane, 2,2-bis(4-hydroxyphenyl) octane, bis(4-hydroxyphenyl)diphenylmethane, 2,2-bis(4-hydroxy-3-methylphenyl)propane, 1,1-bis(4-hydroxy-3-tert-butylphenyl)propane, 2,2-bis(4-hydroxy-3-bromophenyl)propane, 2,2-bis(4-hydroxy-3,5-dibromophenyl)propane, and 2,2-bis(4-hydroxy-3,5-dichlorophenyl)propane; bis(hydroxyaryl)cycloalkanes, such as 1,1-bis(4-hydroxyphenyl)cyclopentane and 1,1-bis(4-hydroxyphenyl)cyclohexane; dihydroxydiaryl ethers, such as 4,4'-dihydroxydiphenyl ether and 4,4'-dihydroxy-3,3'-dimethyldiphenyl ether; dihydroxydiaryl sulfides, such as 4,4'-dihydroxydiphenyl sulfide and 4,4'-dihydroxy-3,3'-dimethyldiphenyl sulfide; dihydroxydiaryl sulfoxides, such as 4,4'-dihydroxydiphenyl sulfoxide; and dihydroxydiaryl sulfones, such as 4,4'-dihydroxydiphenyl sulfone and 4,4'-dihydroxy-3,3'-dimethyldiphenyl sulfone.

These may be used alone, or at least two types may be used in combination. In addition to these, piperazine, dipiperidyl hydroquinone, resorcin, 4,4'-dihydroxydiphenyls, and the like may be used in combination.

The above-described dihydroxydiaryl compound and a trivalent or higher phenol compound as described below may be used in combination. Examples of the trivalent or higher phenol compound include phloroglucin, 4,6-dimethyl-2,4,6-tri-(4-hydroxyphenyl)-heptene, 2,4,6-trimethyl-2,4,6-tri-(4-hydroxyphenyl)-heptane, 1,3,5-tri-(4-hydroxyphenyl)-benzol, 1,1,1-tri-(4-hydroxyphenyl)-ethane, and 2,2-bis-(4,4-di(4-hydroxyphenyl)cyclohexyl)-propane.

There is no particular limitation regarding the viscosity average molecular weight (Mv) of the polycarbonate resin such as the aromatic polycarbonate resin, and 15,000 to 40,000 is favorably adopted. If the viscosity average molecular weight (Mv) is less than 15,000, the impact resistance and the heat resistance tend to become poor. If the viscosity average molecular weight (Mv) is more than 40,000, the fluidity is poor, and a problem tends to occur in the formability. The viscosity average molecular weight (Mv) of the polycarbonate resin is more preferably 16,000 to 35,000 and further preferably 18,000 to 30,000.

Therefore, for example, when the aromatic polycarbonate resin is produced, it is preferable that an aromatic polycarbonate resin having such a viscosity average molecular weight be produced by using the above-described dihydroxydiaryl compound or the like and, as the situation demands, a molecular weight adjustor, a catalyst, and the like.

The viscosity average molecular weight [Mv] of the polycarbonate resin is a value calculated based on a viscosity formula expressed by Schnell, that is, $\eta=1.23\times10^{-4} Mv^{0.83}$, where methylene chloride is used as a solvent, and a limiting viscosity [η] (unit of dl/g) at a temperature of 20° C. is determined by using Ubbelohde viscometer. The limiting viscosity [η] is a value calculated on the basis of a formula described below, where the specific viscosity [ηsp] is measured at each solution concentration [C] (g/dl).

$$\eta = \lim_{c \to 0} \eta_{sp}/c \qquad \text{[Math. 1]}$$

Specific examples of the aromatic polycarbonate resin include commercially available "Iupilon Series" and "NOVAREX Series" produced by Mitsubishi Engineering-Plastics Corporation and "TARFLON Series" produced by Idemitsu Kosan Co., Ltd.

The polycarbonate resins such as the aromatic polycarbonate resin may be used alone, or at least two types of polycarbonate resins that differ from each other in monomer composition, physical properties, or the like may be used in combination. For example, at least two types of polycarbonate resins having viscosity average molecular weights that differ from each other may be mixed so that the molecular weight is adjusted to the above-described favorable viscosity average molecular weight and be used.

<Polyacrylic Resin>

The polyacrylic resin is obtained by polymerizing a vinyl-based monomer or a vinyl-based monomer mixture containing (meth)acrylic-acid-ester-based monomer by using a known method. The vinyl-based monomer mixture contains a (meth)acrylic-acid-ester-based monomer as an indispensable component and, as the situation demands, may contain other vinyl-based monomers described below within the range of 40% by mass.

Examples of the (meth)acrylic-acid-ester-based monomer include methyl (meth)acrylate, ethyl (meth)acrylate, n-propyl (meth)acrylate, i-propyl (meth)acrylate, n-butyl (meth) acrylate, i-butyl (meth)acrylate, t-butyl (meth)acrylate, and phenyl (meth)acrylate.

Examples of the vinyl-based monomer other than the (meth)acrylic-acid-ester-based monomer include aromatic vinyl-based monomers, vinyl-cyanide-based monomers, maleimide-based monomers, and (meth)acrylic acid. Regarding the aromatic vinyl-based monomer and the vinyl-cyanide-based monomer, monomers akin to that contained in the vinyl-based monomer mixture (a2) can be used.

Examples of the maleimide-based monomer include N-alkylmaleimides (N-methylmaleimide, N-ethylmaleimide, N-n-propylmaleimide, N-i-propylmaleimide, N-n-butylmaleimide, N-i-butylmaleimide, N-t-butylmaleimide, and the like), N-cycloalkylmaleimides (N-cyclohexylmaleimide and the like), and N-arylmaleimides (N-phenylmaleimide, N-alkyl-substituted phenylmaleimide, N-chlorophenylmaleimide, and the like).

Of the polyacrylic resins, specific examples of the copolymerization resins of methyl methacrylate and methyl acrylate include commercially available "PARAPET G" produced by Kuraray Co., Ltd., and "ACRYPET VH" and "ACRYPET MD" produced by Mitsubishi Chemical Corporation.

Specific examples of polyacrylic resins containing both the (meth)acrylic-acid-ester-based monomer unit and the maleimide-based monomer unit include commercially available "PARAPET SH-N" produced by Kuraray Co., Ltd., and "POLYIMILEX PML203" produced by NIPPON SHOKUBAI CO., LTD.

The polyacrylic resins may be used alone, or at least two types may be used in combination.

<Polybutylene-Terephthalate-Based Resin>

The polybutylene-terephthalate-based resin is a resin usually obtained through a polycondensation reaction of terephthalic acid and/or a derivative thereof and 1,4-butanediol and/or a derivative thereof. Copolymerization products of other copolymerizable dicarboxylic acids and/or derivatives thereof or glycols may also be used as the polybutylene-terephthalate-based resin within the bound of not impairing the object of the present invention.

Examples of the copolymerizable dicarboxylic acid include dicarboxylic acids, such as isophthalic acid, 2-chloroterephthalic acid, 2,5-dichloroterephthalic acid, 2-methylterephthalic acid, 4,4-stilbenedicarboxylic acid, 4,4-biphenyldicarboxylic acid, ortho-phthalic acid, 2,6-naphthalenedicarboxylic acid, bisbenzoic acid, bis(p-carboxyphenyl)methane, anthracenedicarboxylic acid, 4,4-diphenyl ether dicarboxylic acid, 4,4-diphenoxyethanedicarboxylic acid, adipic acid, sebacic acid, azelaic acid, dodecanedioic acid, 1,3-cyclohexanedicarboxylic acid, and 1,4-cyclohexanedicarboxylic acid, and derivatives thereof. The copolymerizable dicarboxylic acids and/or derivatives thereof appropriately selected from, for example, those described above are used alone, or at least two types are used in combination.

Examples of the copolymerizable glycols include ethylene glycol, 1,2-propylene glycol, 1,3-propanediol, 2,2-dimethyl-1,3-propanediol, trans- or cis-2,2,4,4-tetramethyl-1,3-cyclobutanediol, neopentyl glycol, 1,5-pentanediol, 1,6-haxanediol, 1,4-cyclohexanedimethanol, 1,3-cyclohexanedimethanol, decamethylene glycol, cyclohexanediol, p-xylenediol, bisphenol A, tetrabromobisphenol A, and tetrabromobisphenol-A-bis(2-hydroxyethyl ether). The copolymerizable glycols appropriately selected from, for example, those described above are used alone, or at least two types are used in combination.

The limiting viscosity of the polybutylene-terephthalate-based resin is preferably 0.7 to 1.50 dl/g from the viewpoint of sufficiently ensuring the fluidity and the formability of the thermoplastic resin composition according to the present invention and the impact resistance of the thermoplastic resin formed article according to the present invention formed by using the thermoplastic resin composition.

The limiting viscosity of the polybutylene-terephthalate-based resin is measured in a 1:1 (mass ratio) solution mixture of tetrachloroethane and phenol at 30° C.

Specific examples of the polybutylene-terephthalate-based resin include commercially available "NOVADURAN" produced by Mitsubishi Engineering-Plastics Corporation and "DURANEX" produced by POLYPLASTICS CO., LTD.

The polybutylene-terephthalate-based resins may be used alone, or at least two types may be used in combination.

[Inorganic Compound (D)]

The thermoplastic resin composition according to the present invention containing the inorganic compound (D) enables the formability to be improved and enables the form of a product to be stabilized.

Examples of the inorganic compound (D) include metal fiber, aramid fiber, asbest, potassium titanate whisker, wollastonite, glass flake, glass beads, talc, mica, clay, calcium carbonate, barium sulfate, titanium oxide, and aluminum oxide.

The shape of the inorganic compound (D) is preferably flat-plate-like, linear, or scale-like. Of these, a plate-like shape or a scale-like shape is more preferable from the viewpoint of the appearance, the wrinkling resistance against bending, and the repetitive bending property.

The volume average particle diameter (MV) determined by a laser diffraction method of the inorganic compound (D) is preferably 1 to 200 μm, more preferably 2 to 120 μm, further preferably 10 to 80 μm, and particularly preferably 15 to 40 μm.

When the volume average particle diameter (MV) of the inorganic compound (D) is more than or equal to the above-described lower limit, the weld strength, the weld retention rate, the wrinkling resistance against bending, and the repetitive bending property are favorable. When the volume average particle diameter (MV) of the inorganic compound (D) is less than or equal to the above-described upper limit, the formability, the formed article appearance, and the weld retention rate are favorable.

The ratio (aspect ratio) of the thickness to the volume average particle diameter (MV) of the inorganic compound (D) is preferably 5 to 150, more preferably 10 to 120, and further preferably 40 to 90.

The reason is that when the aspect ratio is more than or equal to the above-described lower limit, a balance between the formability, the wrinkling resistance against bending, and the repetitive bending property is favorable. When the aspect ratio is less than or equal to the above-described upper limit, the formed article appearance, the weld strength, the weld retention rate, the touch feeling (grip performance), and the slip resistance are favorable.

The inorganic compounds (D) may be used alone, or at least two types may be used in combination. Of these, titanium oxide, talc, mica, and calcium carbonate are preferable, and in particular, mica is preferable from the viewpoint of the appearance, the wrinkling resistance against bending, and the repetitive bending property.

Mica include dry-ground mica and wet-ground mica, and wet-ground mica is preferable. In particular, wet-ground muscovite is preferable. Wet grinding has higher utility value than dry grinding due to high purity and no influence being exerted on the appearance.

Regarding the thermoplastic resin composition according to the present invention, the content of the component (D) in the total 100% by mass of the component (A) to the component (D) is 0.5% to 20% by mass, preferably 2% to 18% by mass, and more preferably 3% to 15% by mass. When the content of the component (D) is more than or equal to the above-described lower limit, the above-described effect due to using the component (D) can be sufficiently obtained. When the content of the component (D) is less than or equal to the above-described upper limit, the mechanical properties, the formed article appearance, and the like are not impaired.

[Other Additives]

To improve the performance as a forming resin, various additives may be added to the thermoplastic resin composition according to the present invention within the bound of not impairing the object of the present invention.

For example, as the situation demands, various stabilizers, such as antioxidants of hindered phenol base, sulfur-containing organic compound base, phosphorus-containing organic compound base, and the like, heat stabilizers of phenol base, acrylate base, and the like, transesterification inhibitors e.g. a mixture of monostearyl acid phosphate and distearyl acid phosphate, ultraviolet absorbers of benzotriazole base, benzophenone base, salicylate base, and the like, and light stabilizers of organic nickel base, hindered amine base, and the like; lubricants, such as higher fatty acid metal salts and higher fatty acid amides; plasticizers, such as phthalic acid esters and phosphoric acid esters; flame retardants and flame retardant auxiliaries, such as halogen-containing compounds e.g. polybromodiphenyl ether, tetrabromobisphenol A, brominated epoxy oligomers, and brominated polycarbonate oligomers, phosphorus-based compounds, and antimony trioxide; and carbon black, pigments, dyes, and the like may be added.

[Method for Producing Thermoplastic Resin Composition]

The thermoplastic resin composition according to the present invention may be produced by using various methods, for example, the above-described components (A) to (D) and the above-described additives which are used as the situation demands are melt-kneaded by using a Banbury mixer, a roll, or a single-screw or multi-screw extruder.

[Thermoplastic Resin Formed Article]

The thermoplastic resin formed article according to the present invention is obtained by forming the thermoplastic resin composition according to the present invention by using a known forming method.

Examples of the forming method include an injection molding method, a press molding method, an extrusion molding method, a vacuum forming method, and a blow molding method.

The thermoplastic resin formed article according to the present invention produced by forming the thermoplastic resin composition according to the present invention undergoes no peeling nor whitening during a forming process, acquires excellent appearance and mechanical properties, in particular, weld strength, has bending performance so that no wrinkles occur during bending and so that the bending property is maintained against repetitions, and has slip resistance and high grip performance.

The thermoplastic resin formed article according to the present invention may be used as a grip surface or parts of a casing of electric or electronic components, automobile components, machine mechanism components, OA equipment, housing components of home electric appliances, general merchandise, housing construction materials, and the like.

EXAMPLES

To further specifically explain the present invention, the description will be provided below with reference to the examples and the comparative examples. These examples do not limit the present invention. "%" expresses % by mass, and "part" expresses part by mass, unless otherwise specified.

The volume average particle diameter of the rubber-like polymer (a1) and the graft rate of the rubber-containing graft copolymer (A) were measured as described in (1) and (2) below, respectively.

(1) Volume Average Particle Diameter

The volume average particle diameter of the rubber-like polymer (a1) in a latex was measured at room temperature by using "Microtrac UPA150" (trade name) produced by HONEYWELL. The unit is nm.

It is known that there is substantially no difference between the latex particle diameter of the rubber-like polymer (a1) and the rubber particle diameter of the rubber-like polymer (a1) in the resin composition by using the rubber-like polymer (a1), and the former is in accord with the latter.

(2) Graft Rate

The graft rate of the rubber-containing graft copolymer (A) is calculated on the basis of a formula below.

$$\text{graft rate}(\% \text{ by mass}) = \{[(n) - m \times L]/[(m) \times L]\} \times 100$$

In the above-described formula, n represents mass n (g) of acetone-insoluble matters obtained by placing about 1 g [weighing capacity: m (g)] of the rubber-containing graft copolymer (A) into 20 ml of acetone, performing shaking for 2 hours by using a shaker under a temperature condition of 25° C., and performing centrifugal separation for 60 minutes by using a centrifuge (rotational speed: 23,000 rpm) under a temperature condition of 5° C. so as to separate acetone-insoluble matters and acetone-soluble matters from each other.

L represents the mass (g) of the rubber-like polymer (a1) contained in the rubber-containing graft copolymer (A). The mass of the rubber-like polymer (a1) may be determined by using a method for calculating from the polymerization proportion and the degree of polymerization conversion, a method for determining based on the infrared absorption spectrum, or the like.

[Rubber-Containing Graft Copolymer (A)]

Synthesis Example 1: Production of Rubber-Containing Graft Copolymer (A1)

The interior of a reactor was replaced with nitrogen, and 120 parts of pure water, 0.5 parts of glucose, 0.5 parts of sodium pyrophosphate, 0.005 parts of ferrous sulfate, and 60 parts (in terms of solid contents) of polybutadiene latex having a volume average particle diameter of 280 nm were charged, and the temperature in the reactor was increased to 65° C. while agitation was performed. The point in time of the internal temperature reaching 65° C. was assumed to be the start of polymerization, and 30 parts of styrene, 10 parts of acrylonitrile, and 0.25 parts of a chain transfer agent, t-dodecylmercaptan mixture, were continuously added over 5 hours. Simultaneously, an aqueous solution composed of a polymerization initiator, cumenehydroperoxide (0.2 parts), and potassium oleate was continuously added over 7 hours so as to complete a reaction. The resulting latex was mixed with 1 part of 2,2'-methylenebis(4-methyl-6-t-butylphenol) relative to 100 parts of latex solid contents. Subsequently, the latex was solidified with sulfuric acid, neutralized with sodium hydroxide, washed, filtered, and dried so as to obtain a powder-like rubber-containing graft copolymer (A1).

The rubber content of the rubber-containing graft copolymer (A1) was 60%, and the graft rate was 55%.

Synthesis Example 2: Production of
Rubber-Containing Graft Copolymer (A2)

A rubber-containing graft copolymer (A2) was produced by using the same method as the production of the rubber-containing graft copolymer (A1) of synthesis example 1 except that the amount of the polybutadiene latex having a volume average particle diameter of 280 nm charged was set to be 40 parts (in terms of solid contents) and that the amount of styrene added was changed to 45 parts, the amount of acrylonitrile added was changed to 15 parts, and the amount of chain transfer agent, t-dodecylmercaptan mixture, was changed to 0.28 parts.

The rubber content of the rubber-containing graft copolymer (A2) was 40%, and the graft rate was 95%.

[Thermoplastic Elastomer (B)]

Regarding a thermoplastic elastomer (B1), a hydrogenated block copolymer "DYNARON DR8903P" (trade name) (the styrene/butadiene mass ratio of the thermoplastic elastomer (B1) before hydrogenation was 35/65) produced by JSR Corporation, which is a styrene-ethylene-butylene-styrene copolymer (SEBS), was used.

The thermoplastic elastomer (B1) had an MFR (230° C., 21.2 N) of 10 g/10 min and an MFR (200° C., 49.0 N) of 4 g/10 min.

[Another Thermoplastic Resin (C)]

Synthesis Example 3: Production of
Acrylonitrile-Styrene-Based Resin (C1)

The interior of a reactor was replaced with nitrogen, and 120 parts of water, 0.002 parts of sodium alkylbenzenesulfonate, 0.5 parts of polyvinyl alcohol, 0.3 parts of azoisobutyronitrile, 0.5 parts of t-dodecylmercaptan, and a monomer mixture composed of 26 parts of acrylonitrile and 74 parts of styrene were used, and the temperature was increased for 5 hours from a start temperature of 60° C. by heating while a portion of styrene was successively added so as to reach 120° C. Further, the reaction was performed at 120° C. for 4 hours. Thereafter, polymerized material was removed so as to obtain an acrylonitrile-styrene-based resin (C1) in which acrylonitrile/styrene=26/74 (mass ratio).

The mass average molecular weight (Mw) and the molecular weight distribution (Mw/Mn) of the acrylonitrile-styrene-based resin (C1) in terms of polystyrene were measured by using GPC (GPC: "GPC/V2000" produced by Waters, column: "Shodex AT-G+AT-806MS" produced by SHOWA DENKO K.K.) and using o-dichlorobenzene (145° C.) as a solvent. As a result, the mass average molecular weight (Mw) was 110,000, and the molecular weight distribution (Mw/Mn) was 2.3.

<Aromatic Polycarbonate Resin (C2)>

Regarding an aromatic polycarbonate resin (C2), "Iupilon S-2000F" (viscosity average molecular weight (Mv): 22,000) produced by Mitsubishi Engineering-Plastics Corporation was used.

<Polyacrylic Resin (C3)>

Regarding a polyacrylic resin (C3), "ACRYPET VH5" produced by Mitsubishi Chemical Corporation was used.

<Polybutylene Terephthalate Resin (C4)>

Regarding polybutylene terephthalate resin (C4), "NOVADURAN 5020" (limiting viscosity (30° C.): 1.20 dl/g) produced by Mitsubishi Engineering-Plastics Corporation was used.

[Inorganic Compound (D)]

Regarding an inorganic compound (D1), "A-21 (trade name)" (wet-ground muscovite, volume average particle diameter of 22 µm, aspect ratio of 70) produced by YAMAGUCHI MICA CO., LTD., was used.

Examples 1 to 8 and comparative examples 1 to 6

<Production of Thermoplastic Resin Composition>

Components (A), (B), (C), and (D) described in Tables 1A and 1B below were mixed at a mixing ratio described in Tables 1A and 1B. Thereafter, 0.2 parts of ADK STAB "A-60 (trade name)" (tetrakis[methylene-3-(3',5'-di-t-butyl-4'-hydroxyphenyl)propionate]methane) produced by ADEKA Corporation was mixed, and melt-kneading performed by using Twin Screw Extruder (Model name "TEX44, Japan Steel Works, Ltd.") at a barrel temperature of 220° C. so as to perform pelletization. Formed articles (1) to (4) below were produced by using the resulting thermoplastic resin composition pellet and were subjected to the measurement and the evaluation below. The results are described in Tables 1A and 1B.

<Production of Formed Article (1)>

A test piece of 120 mm×80 mm×2 mm was produced by using an injection molding machine "IS100GN" (trade name) produced by TOSHIBA MACHINE CO., LTD. under the conditions of a resin temperature of 220° C., a mold temperature of 50° C., an injection rate of 40 mm/s, and an injection pressure of 100 MPa. A leather grain mold (grain No.: TH-894) having unevenness (the depth of a recessed portion was 100 µm) on the inner surface was used as a mold for forming.

<Production of Formed Article (2)>

A dumbbell test piece (without weld) having a gate on one side was produced by using an injection molding machine "J110AD-180H" (Model name) produced by Japan Steel Works, Ltd., while the cylinder temperature was set to be 220° C., and the mold temperature was set to be 50° C. Subsequently, a test piece (size: 80×10×4 mm) without a weld was produced by cutting the central portion of the resulting dumbbell test piece.

<Production of Formed Article (3)>

A dumbbell test piece with a weld was produced by using a mold capable of forming a weld at the center of the test piece having a gate at both ends and by using the injection molding machine "J110AD-180H" (Model name) produced by Japan Steel Works, Ltd., while the cylinder temperature was set to be 220° C., and the mold temperature was set to be 50° C. Subsequently, a test piece (size: 80×10×4 mm) with a weld at the central portion was produced by cutting the central portion of the resulting dumbbell test piece with a weld at the central portion.

<Production of Formed Article (4)>

A dumbbell test piece (size: 80×10×4 mm) having a gate on one side was produced by using the injection molding machine "J110AD-180H" (Model name) produced by Japan Steel Works, Ltd., while the cylinder temperature was set to be 220° C., and the mold temperature was set to be 50° C.

<Measurement of Hardness>

The formed article (4) was used, and Rockwell hardness (hardness scale was R-scale) at room temperature was measured in conformity with ISO 2039.

<Measurement of Flexural Strength>

The formed article (2) was used, and flexural yield strength (FS0) was measured in conformity with ISO 178. The unit of the measurement value is MPa.

<Measurement of Flexural Strength of Weld Portion>

The formed article (3) was used, and flexural yield strength (FS1) was measured in conformity with ISO 178. The unit of the measurement value is MPa.

<Evaluation of Weld Strength Retention Rate>

Regarding the flexural yield strength without a weld (FS0) and the flexural yield strength of the weld portion (FS1) measured in conformity with ISO 178, a weld strength retention rate (%) was determined by using a formula below. It is indicated that a material having higher retention rate has higher weld strength. Practically, 70% or more of retention rate is necessary.

$$\text{weld strength retention rate}(\%) = (FS1)/(FS0) \times 100$$

<Measurement of Flexural Modulus of Elasticity>

The formed article (2) was used, and flexural modulus of elasticity was measured in conformity with ISO 178. The unit of the measurement value is MPa.

<Measurement of Temperature of Deflection Under Load (Heat Deflection Temperature: HDT)>

The formed article (4) was used, and a temperature of deflection under load was measured in conformity with ISO 75 (flatwise B method, load of 1.82 MPa). The unit of the measurement value is ° C.

<Evaluation of Formed Article Appearance>

The formed article (1) was used, both the grain surface and the mirror surface were visually observed, and evaluation was performed on the basis of the criteria described below.

◯: neither (i) flow mark nor (ii) peeling nor (iii) whitening occurred

Δ: one of (i) flow mark, (ii) peeling, and (iii) whitening occurred in a portion of the formed article x: one of (i) flow mark, (ii) peeling, and (iii) whitening occurred on the entire surface of the formed article <Evaluation of Touch Feeling (Grip Feeling)>

The touch feeling when a finger was moved along the grain surface of the formed article (1) at normal temperature of 23° C. was evaluated on the basis of the criteria described below.

◯: hard to slip

Δ: somewhat hard to slip x: easy to slip

<Measurement of MIU Value (KES Texture Measurement)

The MIU value of the grain surface of the formed article (1) was measured by using "Friction Tester KES-SE" (trade name) produced by KATO TECH CO., LTD. The MIU value (average frictional coefficient) is an indicator of slip resistance, and a higher value indicates higher slip resistance.

<Evaluation of Wrinkling Resistance Against Bending>

The formed article (1) was bent 20 degrees toward the opposite side (gloss surface side) of the grain surface, the bent side (gloss surface side) was visually observed, and evaluation was performed on the basis of the criteria described below.

◯: no wrinkles occurred x: wrinkles occurred

<Evaluation of Wrinkling Resistance Against Repetitive Bending>

The formed article (1) was bent 20 degrees toward the opposite side (gloss surface side) of the grain surface and, thereafter, returned to the original state. Further, the action of bending 20 degrees were repeated 30 times. Subsequently, the bent side (gloss surface side) was visually observed, and evaluation was performed on the basis of the criteria described below.

◯: no wrinkles occurred

Δ: some small wrinkles occurred x: wrinkles occurred

<Formability Evaluation 1>

The releasability from the mold during forming of the formed article (1) was evaluated on the basis of the criteria described below.

◯: a non-defective product was automatically removed without sticking

Δ: a non-defective product was manually removed while sticking occurred to some extent x: a non-defective product was not removed due to strong sticking <Formability Evaluation 2>

Regarding deformation and discoloration due to an ejector pin during forming of the formed article (1), the following items were examined and evaluated on the basis of the criteria described below.

Presence or absence of deformation (deformation (defect) such as breakage, tear, and peeling) and discoloration (whitening and the like) around traces of 4 ejector pins on the back of the grain surface of the formed article (1)

◯: a non-defective product was removed with neither deformation nor discoloration Δ: deformation did not occur but discoloration occurred x: deformation and discoloration occurred

TABLE 1A

|  |  |  |  | Example | | | | | | | |
|---|---|---|---|---|---|---|---|---|---|---|---|
|  |  |  |  | 1 | 2 | 3 | 4 | 5 | 6 | 7 | 8 |
| Thermoplastic resin composition proportion | Component (A)* | A1(60) | % by mass | 50 | 20 | 25 | 56 | 60 | 64 | 62 |  |
|  |  | A2(40) | % by mass |  |  |  |  |  |  |  | 60 |
|  | Component (B) | B1 | % by mass | 30 | 15 | 10 | 34 | 30 | 30 | 25 | 25 |
|  | Component (C) | C1 | % by mass | 15 |  |  |  |  | 1 | 8 |  |
|  |  | C2 | % by mass |  | 60 | 60 |  |  |  |  |  |
|  |  | C3 | % by mass |  |  |  |  |  |  |  | 10 |
|  |  | C4 | % by mass |  |  |  | 5 | 5 |  |  |  |
|  | Component (D) | D1 | % by mass | 5 | 5 | 5 | 5 | 5 | 5 | 5 | 5 |
|  | Total of components (A) to (D) |  | % by mass | 100 | 100 | 100 | 100 | 100 | 100 | 100 | 100 |
|  | Content of component (a1) in total of components (A) to (D) |  | % by mass | 30.0 | 12.0 | 15.0 | 33.6 | 36.0 | 38.4 | 37.2 | 24.0 |
|  | (a1)-(B) |  | % by mass | 0.0 | −3.0 | 5.0 | −0.4 | 6.0 | 8.4 | 12.2 | −1.0 |

TABLE 1A-continued

|  |  |  | Example 1 | Example 2 | Example 3 | Example 4 | Example 5 | Example 6 | Example 7 | Example 8 |
|---|---|---|---|---|---|---|---|---|---|---|
| Evaluation result | Rockwell hardness | R | 5 | 67 | 67 | 23 | 25 | 4 | 5 | 17 |
|  | Flexural strength | MPa | 10 | 32 | 29 | 5 | 6 | 7 | 9 | 25 |
|  | Flexural strength (weld portion) | MPa | 9 | 25 | 24 | 5 | 6 | 7 | 6 | 22 |
|  | Weld strength retention rate | % | 90 | 78 | 83 | 100 | 100 | 100 | 67 | 88 |
|  | Flexural modulus of elasticity | MPa | 350 | 1060 | 900 | 110 | 140 | 100 | 180 | 650 |
|  | Temperature of deflection under load | °C. | 56 | 105 | 106 | 50 | 52 | 50 | 54 | 65 |
|  | Formed article appearance |  | ○ | ○ | ○ | ○ | ○ | ○ | ○ | Δ |
|  | Touch feeling (grip feeling) |  | ○ | ○ | ○ | ○ | ○ | ○ | ○ | ○ |
|  | MIU value (slip resistance) |  | 0.7 | 0.3 | 0.3 | 0.8 | 0.7 | 0.7 | 0.6 | 0.3 |
|  | Wrinkling resistance against bending |  | ○ | ○ | ○ | ○ | ○ | Δ | Δ | ○ |
|  | Repeatability |  | ○ | ○ | ○ | ○ | ○ | Δ | Δ | Δ |
|  | Formability | Releasability from mold | ○ | ○ | ○ | ○ | ○ | ○ | ○ | ○ |
|  |  | Deformation due to ejector pin | ○ | ○ | ○ | ○ | ○ | ○ | Δ | ○ |

*numerical values in parentheses represent content (% by mass) of rubber-like polymer (a1) in rubber-containing graft copolymer (A)

TABLE 1B

|  |  |  |  | Comparative example 1 | 2 | 3 | 4 | 5 | 6 |
|---|---|---|---|---|---|---|---|---|---|
| Thermoplastic resin composition proportion | Component (A)* | A1(60) | % by mass |  |  |  | 50 | 20 |  |
|  |  | A2(40) | % by mass | 15 | 15 | 60 |  |  | 15 |
|  | Component (B) | B1 | % by mass | 35 | 35 | 25 | 30 | 15 | 35 |
|  | Component (C) | C1 | % by mass | 50 |  | 5 | 20 |  | 45 |
|  |  | C2 | % by mass |  | 50 |  |  | 65 |  |
|  |  | C3 | % by mass |  |  | 10 |  |  |  |
|  |  | C4 | % by mass |  |  |  |  |  |  |
|  | Component (D) | D1 | % by mass |  |  |  |  |  | 5 |
|  | Total of components (A) to (D) |  | % by mass | 100 | 100 | 100 | 100 | 100 | 100 |
|  | Content of component (a1) in total of components (A) to (D) |  | % by mass | 6.0 | 6.0 | 24.0 | 30.0 | 12.0 | 6.0 |
|  | (a1)-(B) |  | % by mass | −29.0 | −29.0 | −1.0 | 0.0 | −3.0 | −29.0 |
| Evaluation result | Rockwell hardness |  | R | 40 | 43 | 15 | 4 | 60 | 42 |
|  | Flexural strength |  | MPa | 28 | 29 | 22 | 12 | 34 | 30 |
|  | Flexural strength (weld portion) |  | MPa | 10 | 9 | 17 | 10 | 13 | 11 |
|  | Weld strength retention rate |  | % | 36 | 31 | 77 | 83 | 38 | 40 |
|  | Flexural modulus of elasticity |  | MPa | 840 | 840 | 600 | 340 | 990 | 900 |
|  | Temperature of deflection under load |  | °C. | 59 | 80 | 64 | 54 | 104 | 61 |
|  | Formed article appearance |  |  | Δ | Δ | Δ | ○ | ○ | Δ |
|  | Touch feeling (grip feeling) |  |  | ○ | ○ | ○ | ○ | ○ | ○ |
|  | MIU value (slip resistance) |  |  | 0.6 | 0.6 | 0.3 | 0.8 | 0.4 | 0.6 |
|  | Wrinkling resistance against bending |  |  | X | X | X | Δ | X | X |
|  | Repeatability |  |  | X | X | X | X | X | X |
|  | Formability | Releasability from mold |  | X | X | Δ | Δ | Δ | Δ |
|  |  | Deformation due to ejector pin |  | X | X | Δ | X | Δ | Δ |

*numerical values in parentheses represent content (% by mass) of rubber-like polymer (a1) in rubber-containing graft copolymer (A)

The following is clarified from Tables 1A and 1B.

In examples 1 to 8 in which the thermoplastic resin composition according to the present invention was used, not only excellent hardness, flexural modulus of elasticity, and formed article appearance were exhibited, but also excellent touch feeling (grip feeling), slip resistance (MIU value), wrinkling resistance against bending, and wrinkling resistance against repetitive bending were exhibited.

In comparative examples 1 to 5 in which the inorganic compound (D) was not contained and in which the requirements of the present invention were not satisfied, poor performance, such as weld strength, appearance, wrinkling resistance against bending, and repetition characteristics thereof, were exhibited.

In comparative example 6 in which the inorganic compound (D) was contained but in which (a1)-(B) was more than 15% by mass, poor performance, such as weld strength, wrinkling resistance against bending, and repetition characteristics thereof, were exhibited.

Although the present invention has been described in detail by way of the specific modes, it is apparent for those skilled in the art that various changes can be made without departing from the spirit and scope of the present invention.

The present application is based on Japanese Patent Application No. 2020-069838 filed on Apr. 8, 2020 and Japanese Patent Application No. 2020-140258 filed on Aug. 21, 2020, the entire contents of which are incorporated herein by reference.

INDUSTRIAL APPLICABILITY

The thermoplastic resin formed article according to the present invention in which the thermoplastic resin composition according to the present invention is used has excellent mechanical strength, formed article appearance, slip resistance of the surface, and favorable touch feeling such as grip feeling and, therefore, is suitable for use as an article which has to be manually operated or be prevented from readily slipping out of a hand, and is capable of providing a product having a repetitive bending property, slip resistance, and high grip performance. Further, the utility value is very high, for example, the thermoplastic resin formed article serves as not only a grip for a hand, but also as a member of a ground surface of a personal computer, a printer, or the like so as to enable a non-slip effect to be realized.

The invention claimed is:

1. A thermoplastic resin composition comprising 7% to 64% by mass of rubber-containing graft copolymer (A), 2% to 35% by mass of thermoplastic elastomer (B), 0.5% to 15% by mass of acrylonitrile-styrene-based resin (C), and 0.5% to 20% by mass of inorganic compound (D) having volume average particle diameter (MV) of 1 to 200 μm (where a total of (A), (B), (C), and (D) (hereafter referred to as "total of a component (A) to a component (D)") is 100% by mass),
wherein the rubber-containing graft copolymer (A) is a graft copolymer in which 35 to 80 parts by mass of rubber-like polymer (a1) selected from diene-based rubber, acrylic rubber, and ethylene-based rubber is graft-polymerized with 20 to 65 parts by mass of vinyl-based monomer mixture (a2) containing an aromatic-vinyl-based monomer and a vinyl-cyanide-based monomer (where a total of the rubber-like polymer (a1) and the vinyl-based monomer mixture (a2) is 100% by mass),
the thermoplastic elastomer (B) is a styrene-based elastomer which is a block copolymer containing at least one polymer block P of an aromatic vinyl compound and at least one polymer block Q of a conjugated diene compound and/or a hydrogenation product thereof, and
a difference between the content (% by mass) of the rubber-like polymer (a1) in the total 100% by mass of the component (A) to the component (D) and the content (% by mass) of the thermoplastic elastomer (B) is within 15% by mass.

2. The thermoplastic resin composition according to claim 1, wherein the volume average particle diameter of the rubber-like polymer (a1) is 100 to 1,500 nm, the ratio of the aromatic-vinyl-based monomer to the vinyl-cyanide-based monomer in 100% by mass of the vinyl-based monomer mixture (a2) is aromatic-vinyl-based monomer/vinyl-cyanide-based monomer=50% to 95% by mass/50% to 5% by mass, and the graft rate of the rubber-containing graft copolymer (A) is 20% to 100% by mass.

3. The thermoplastic resin composition according to claim 1, wherein the MFR (200° C., 49.0 N) of the thermoplastic elastomer (B) is 1 to 25 g/10 min, and the MFR (230° C., 21.2 N) is 3 to 30 g/10 min.

4. The thermoplastic resin composition according to claim 1, wherein the thermoplastic elastomer (B) is the styrene-based elastomer having a content of the polymer block P of 5% to 60% by mass, and a content of the polymer block Q of 95% to 40% by mass.

5. The thermoplastic resin composition according to claim 1, wherein the inorganic compound (D) is muscovite.

6. A thermoplastic resin formed article produced by forming the thermoplastic resin composition according to claim 1.

7. The thermoplastic resin composition according to claim 2, wherein the MFR (200° C., 49.0 N) of the thermoplastic elastomer (B) is 1 to 25 g/10 min, and the MFR (230° C., 21.2 N) is 3 to 30 g/10 min.

8. The thermoplastic resin composition according to claim 2, wherein the thermoplastic elastomer (B) is the styrene-based elastomer having a content of the polymer block P of 5% to 60% by mass, and a content of the polymer block Q of 95% to 40% by mass.

9. The thermoplastic resin composition according to claim 3, wherein the thermoplastic elastomer (B) is the styrene-based elastomer having a content of the polymer block P of 5% to 60% by mass, and a content of the polymer block Q of 95% to 40% by mass.

10. The thermoplastic resin composition according to claim 2, wherein the inorganic compound (D) is muscovite.

11. The thermoplastic resin composition according to claim 3, wherein the inorganic compound (D) is muscovite.

12. The thermoplastic resin composition according to claim 4, wherein the inorganic compound (D) is muscovite.

13. A thermoplastic resin formed article produced by forming the thermoplastic resin composition according to claim 2.

14. A thermoplastic resin formed article produced by forming the thermoplastic resin composition according to claim 3.

15. A thermoplastic resin formed article produced by forming the thermoplastic resin composition according to claim 4.

16. A thermoplastic resin formed article produced by forming the thermoplastic resin composition according to claim 5.

* * * * *